May 5, 1942.    O. F. RITZMANN    2,281,949
APPARATUS FOR SEISMOGRAPH PROSPECTING
Filed Dec. 14, 1938    2 Sheets-Sheet 1
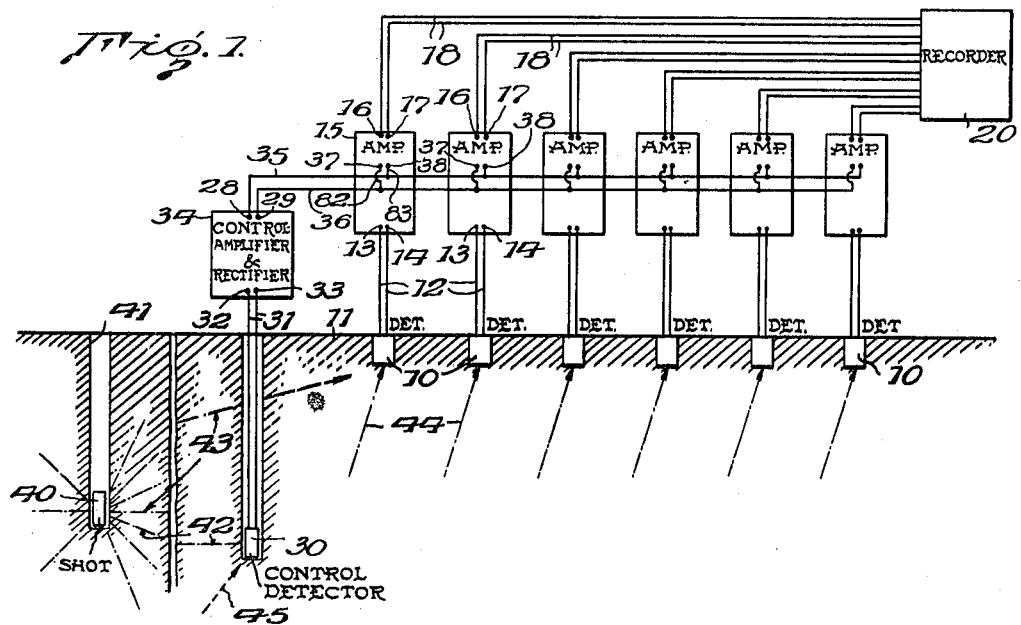
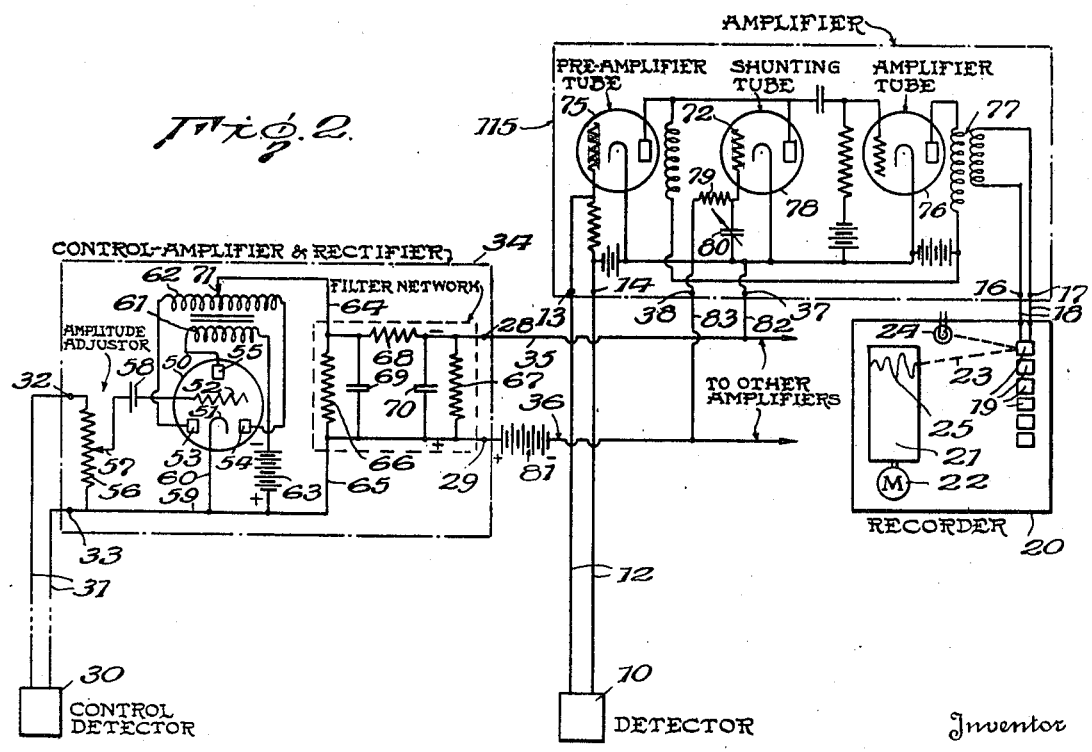
Inventor
O. F. Ritzmann,
By A. M. Houghton
his Attorney

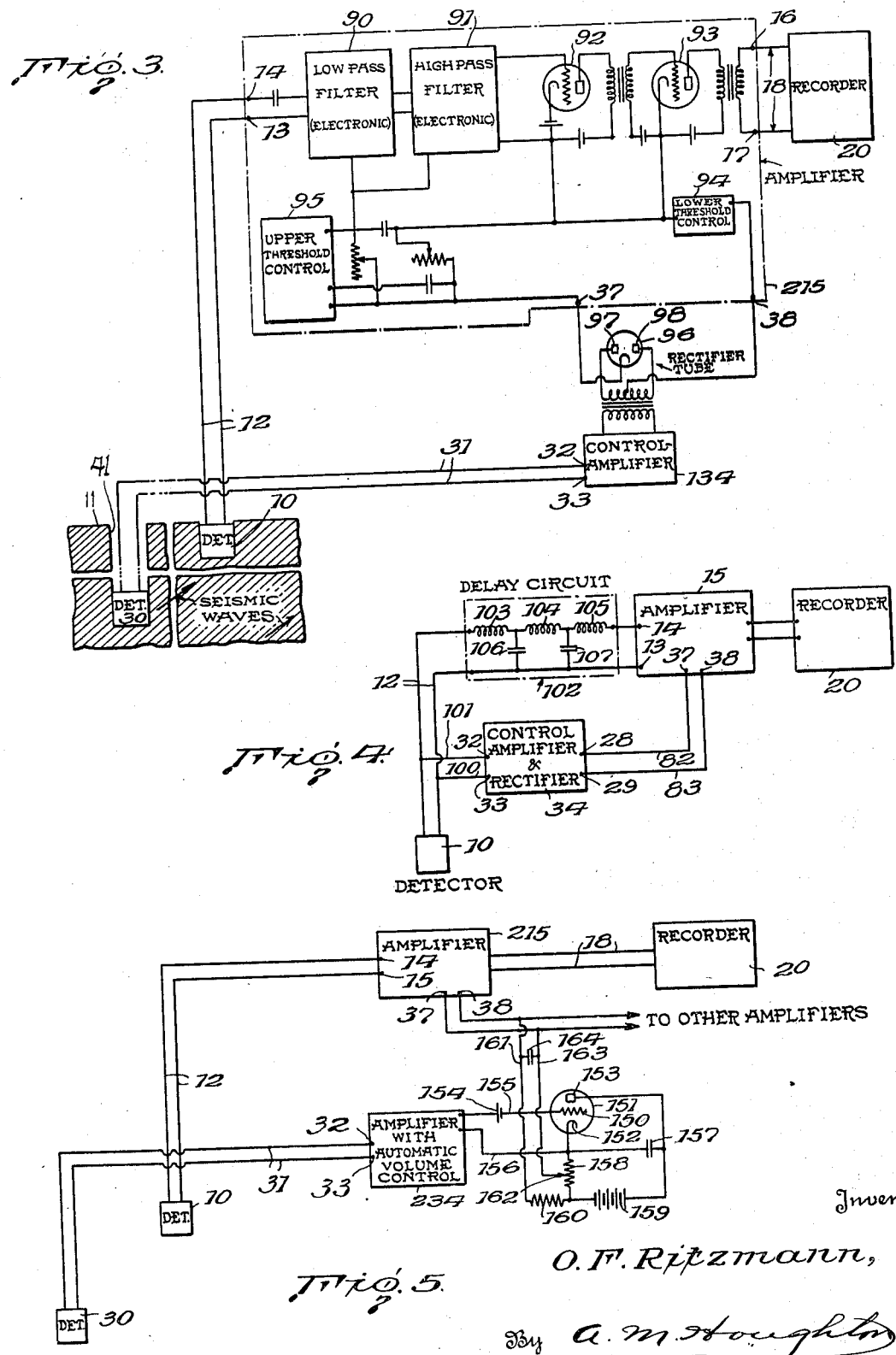

Patented May 5, 1942

2,281,949

UNITED STATES PATENT OFFICE 2,281,949

APPARATUS FOR SEISMOGRAPH PROSPECTING

Otto F. Ritzmann, Pittsburgh, Pa., assignor to Gulf Research & Development Company, Pittsburgh, Pa., a corporation of Delaware Application December 14, 1938, Serial No. 245,792

13 Claims. (Cl. 177—352)

This invention or discovery relates to apparatus for seismograph prospecting; and it comprises in combination means for detecting seismic waves in the earth and arranged to produce electrical signals corresponding to such waves, amplifying means for the signals, means for recording the amplified signals, electrically operable control means for the amplifying means, and means for delivering signal energy from the detecting means to said control means shortly before the same signal energy arrives at the amplifying means; all as more fully hereinafter set forth and as claimed.

One object of the invention is the provision of seismograph prospecting apparatus including detectors, amplifiers and recorders, in which the amplifiers are controlled as to some characteristic, e. g. amplification factor or frequency response, by a controlling device operating by signal energy delivered thereto shortly before receipt of the detector signals at the amplifier input.

Another object is the provision of such a seismograph prospecting system including detectors, amplifiers and recorders, in which control energy is taken from a control detector located nearer the source of the seismic waves than are the other detectors, and this control energy is caused to tune the amplifier or adjust the amplification factor thereof approximately simultaneously with receipt of the signals of the other detectors at the corresponding amplifier.

Another object is the provision of an adjustable amplifier in seismograph systems, in which the amplifier is arranged for adjustment in accordance with detector signal energy, slightly before the detector signals arrive at the amplifier, or simultaneously with such arrival.

In seismograph prospecting, a small-scale artificial earthquake is instituted, by exploding a charge of dynamite buried in the earth. Seismic waves are propagated from this shot point in all directions. Some of the wave energy travels close to the surface of the ground (the direct wave) and some of it penetrates downwardly. The downwardly penetrating waves are reflected and refracted at strata surfaces and other discontinuities in the underground regions, and some of the wave energy reaches the surface of the earth again, causing local earth tremors. By detecting earth tremors at points in the general neighborhood of the shot point (that is, within a distance of a few hundred or thousand yards therefrom) and recording such tremors, information can be secured, by a study of the records, as to the depth and inclination of the strata interfaces etc., at which the reflections occurred. Various arrangements of detectors, amplifiers and recorders have been devised for this purpose.

In making weathering corrections it is desirable to record for study the exact instant at which the energy of the direct wave (which has traversed the upper layers) first appears at the detectors; that is the "first break" in the record trace corresponding to initial appearance of such wave energy at the detectors.

The direct wave is ordinarily the first wave to arrive at the detectors and is usually much stronger than the reflected or refracted waves subsequently received. Accordingly there are mechanical difficulties in reproducing the direct wave and the reflected or refracted waves on a single record. Various proposals have been made for reducing somewhat the amplitude of the direct wave on the record while preserving more or less the amplitude of the reflected or refracted waves on the record. One of the best expedients is to employ, instead of a plain amplifier, an amplifier fitted with an automatic volume control similar to those employed in radio sets; that is, arranged so that some of the signal energy at the amplifier input or output is caused to control the amplification of the amplifier in accordance with the strength of the signals. In such arrangements, when the signal tends to get unduly strong, the amplifier is automatically rendered less sensitive by the control.

In such systems the controlling action at any instant is proportional to the average signal energy received over the previous short interval of time. Reduction of gain or volume does not follow instantly an abrupt increase in signal energy. That is, the control circuit has a certain amount of time lag in its action, and upon sudden increase in signal energy (corresponding to receipt of a sharp tremor), the first part of the signal may be considerably over-amplified before the control takes hold. As a result there may be distortion and vitiation of the record. If the volume control is adjusted for a relatively long time lag, the variation in amplifier gain is smooth and gradual, but difficulty is experienced at the beginning of the record because the gain reduction does not follow closely enough the sudden onset of extremely high amplitude waves following the first arrival. If the control is adjusted for a short time lag, in an effort to have it get into action more quickly after appearance of a high amplitude vibration, then the control tends to follow all later sudden variations in signal amplitude too closely and distortion occurs.

It is also found that the tuning of an amplifier is an important factor in obtaining the best possible record. For the best results, the amplifier tuning should be varied in a definite manner during receipt of the several successive signals, so that the amplifier will be tuned at any instant, at the optimum value for securing the clearest record. It has been proposed to adjust the amplifier tuning continuously, during receipt of the several signals, by control means operable by currents in the amplifier, in a manner analogous to the automatic volume control above mentioned. Such controls depend on the observed fact that in a general way the optimum tuning frequency is proportional to the signal strength. The control is constituted so that a decrease in signal strength results in tuning the amplifier to a lower frequency range and vice versa. Here too, a time lag is inevitable; the control cannot follow sudden changes closely.

According to the present invention, there is provided a system in which the stated disadvantages of ordinary self-controlling amplifiers are obviated, and new advantages secured, by arranging for compensation of the lag period in the functioning of the control. What I regard as the best embodiment of the invention is achieved by providing a separate detector, distinct from the usual set of detectors, positioned so as to receive seismic waves before the other detectors receive them, and arranged to actuate the controls of the amplifiers for the set of detectors. In other embodiments only the usual number of detectors and amplifiers is used, and the output of each detector is divided. A portion of the signal energy from the detector is delivered directly to the amplifier control means for actuation thereof in response to variations in signal volume, while the remainder of the signal energy from the detector is applied to the amplifier input through an electrical delay circuit, so that the signal to be amplified is held back, so to speak, to give the control time to get into action. Lag is thus obviated by purely electrical means. The new systems have, in addition to the provision of correct timing of the amplifier controls, the important practical advantage that a plurality of amplifiers can be controlled simultaneously and uniformly with a minimum of complication.

Four main embodiments of the invention are shown diagrammatically in the accompanying drawings, in which—

Fig. 1 is a diagrammatic view of a complete seismograph receiving system embodying the control;

Fig. 2 is a diagram of the system in which amplitude or volume is controlled;

Fig. 3 is a diagram illustrating the adaptation of the invention to frequency control;

Fig. 4 is a diagram showing a system in which lag is obviated by electrical means; and Fig. 5 is a diagram showing a modification adapted for automatic tuning of an amplifier in accordance with the frequency of waves received at an advance detector.

Referring to the drawings, Fig. 1 shows the complete system schematically, including a plurality of seismic detectors 10, set up in the earth 11, each being connected through a pair of leads 12 with the input terminals 13 and 14 of an amplifier 15, the output terminals of which, indicated at 16 and 17, are connected by a pair of leads 18 with an oscillograph element 19 of a recorder 20 (Fig. 2). The detectors are of known type and are adapted to respond to the actual earth movement, or to the velocity or the acceleration of such movement, as desired. The recorder comprises a plurality of the oscillograph elements 19, one for each amplifier (six are shown in Figs. 1 and 2), and a moving surface 21 of photographic sensitized paper, moved at uniform speed by a motor 22. Each oscillograph element is adapted to direct a beam of light, indicated in dotted lines at 23, from a lamp 24 to the sensitized surface, so that as the oscillograph element is vibrated by the amplified signals from the seismic detectors, a corresponding trace 25 is produced on the sensitized surface. Upon trembling of the earth at the detectors, an electrical signal is developed by the detectors, which is recorded as the trace 25.

Each amplifier has an electrically operable control device, for control of amplitude or frequency, as will be described in detail below. The control device is operated by a control detector circuit which includes a detector 30, usually, but not necessarily, of the same type as the detectors 10, buried in the ground as shown, and delivering through leads 31 to the input terminals 32 and 33 of a rectifying amplifier 34, the rectified output of which is taken off at terminals 28 and 29 and applied, through a pair of leads 35 and 36, to the control means of each amplifier; a pair of terminals 37 and 38 being provided at each amplifier for this connection, as shown.

In operation, a shot 40, such as a charge of dynamite, buried in a bore 41, is set off in a known way. The shot point may be several hundred yards up to several miles away from the group of detectors 10. Waves are propagated by the shot in all directions as indicated by rays in Fig. 1. Some of the wave energy travels along at or near the surface of the earth, and reaches detector 30 by a path such as indicated at 42, and detectors 10 by a path 43; both paths being roughly horizontal. These direct waves are the first to reach the detectors. Some of the wave energy is directed downward, and the waves are reflected, refracted, etc., from deep subterranean geological structures (not shown) and reach the detectors 10 and 30 by steeply inclined paths such as 44 and 45.

The advance or control detector 30 is nearer the shot point than the detectors 10, and is also located below detectors 10, as shown. It receives both the direct wave and the reflected waves before detectors 10 receive them. Upon receipt of a tremor at the detector 30, a signal is produced by the detector. The signal is an irregular alternating current. This current is amplified and rectified, that is, converted to a direct current, and this direct current is applied to the several amplifier controls to actuate them. Upon sudden change in the tremors at detector 30, the controls are correspondingly modified, and the adjustment is complete by the time the amplifiers begin to receive signals from detectors 10: usually a fraction of a second later. Lag is eliminated. The deep reflected waves (44) arrive at all the detectors 10 substantially simultaneously.

Fig. 2 shows in detail, by way of illustration, one suitable form of rectifying amplifier (34) and one useful form of main amplifier 115. The rectifying amplifier includes a tube 50 containing a cathode 51 (heated by suitable known means, not shown), a grid 52 and three plates 53, 54 and 55. The signal from the control detector is supplied to the amplifier at terminals 32 and 33, which are shunted by a resistor 56 with variable tap 57 to serve as an amplitude or amplification factor adjustment. The tap 57 is connected through a battery 58 with the grid. Terminal 33 is connected to the cathode by leads 59 and 60. A transformer is provided, having a primary 61 and a secondary 62 center-tapped at 71, the primary being connected to plate 55 and to lead 59 through a battery 63, and the secondary being connected across plates 53 and 54. The center tap 71 of the secondary, and lead 59, are connected by leads 64 and 65 respectively with a filter network shown as including two shunt resistors 66 and 67, a series resistor 68, and two shunt condensers 69 and 70.

The signal from control detector 30 is applied to the grid of tube 50 as described, and the amplified output appears across secondary 62. The output is applied to diode plates 53 and 54, and a rectified current appears across leads 64 and 65. The ripple in the rectified current is smoothed out by the filter network, which also introduces a time constant or lag which makes the changes in control voltage appearing in leads 35 and 36, smooth and gradual, whereby the character of the wave trains being amplified in amplifier 115 is not greatly altered. This time constant is long compared to the time duration of any of the individual waves received by the system, and results in a delay in the control action.

While the amplifying and rectifying actions are shown as combined in a single tube, these two functions can of course be separated if desired; a separate amplifier and rectifier being provided.

Amplifier 115 is shown as of conventional form, with a conventional shunting tube arrangement known per se in automatic volume control circuits. The amplifier comprises a preamplifier tube 75, receiving signals from detector 10 through terminals 13 and 14, and an amplifier tube 76, the output of which is applied through a transformer 77 to one of the oscillograph elements 19 of the recorder, as shown. A shunting tube 78 is arranged between tubes 75 and 76, as shown. Adjustment of the grid bias of this tube determines the amplification factor of the amplifier. A battery 81 is in circuit with leads 35 and 36 as shown, and control power is taken off by leads 82 and 83 delivering to terminals 37 and 38 of the amplifier. Lead 83 is connected to the grid 72 through a resistor 79, and lead 82 is connected to the cathode circuit of tubes 75, 76 and 78, as shown. A variable condenser 80 is connected across the grid and cathode of tube 78 as shown. The battery 81 (which is common to all the other amplifiers, if other amplifiers are used) serves to bias the grid 72 of the shunting tube so that in the absence of an applied controlling voltage the tube has a relatively high plate impedance and a small shunting effect. Control voltage from the control amplifier is applied across the resistor through leads 82 and 83 as shown, in such way as to make the grid more positive on increase of control voltage, thereby reducing the plate impedance and diverting a larger proportion of energy from the amplifier tube 76. Thus upon increase in signal strength at detector 30, shunting tube 78 acts to reduce the sensitivity of the amplifier 115, and the delay or lag in application of the sensitivity-reducing effect is offset by reason of the arrival of the seismic waves at detector 30 before they arrive at detector 10.

Variable condenser 80 and resistor 79 serve as an additional adjustment of the time constant or lag of the control system. That is, the setting of this condenser determines the interval of time between a sudden increase in signal strength from the seismic detector, and initiation of the shunting action of tube 78. Condenser 80, and its resistor 79, are not strictly essential, but are useful as the condenser enables each amplifier to be adjusted individually to the exact lag required. The lags are not exactly the same for each amplifier when the reflected waves arrive at directions other than vertical which is usually the case. In omitting the condenser and resistor, lead 83 is connected directly to grid 72. In such case the filter network of the control amplifier 34 is relied upon for adjustment of lag.

In the present system the adjustment of the amplifier always takes place smoothly and gradually, that is without abrupt changes of gain factor (or of tuning) but this is not achieved at the expense of delayed controlling action, because the adjustments are initiated before the signal to be recorded reaches the main amplifiers.

Fig. 3 shows a modification in which the main amplifier, 215, is controlled as regards its frequency response, that is to say the amplifier is tuned, in accordance with control energy from the advance detector 30; rather than being controlled as to gain as in Fig. 2. The amplifier 215 is of a known type containing tuning means adjustable by an applied control current, similar to that described in the patent to Harold R. Prescott, No. 2,053,841. The amplifier includes electronic low pass and high pass filters 90 and 91, amplifier tubes 92 and 93, a lower threshold control 94, and an upper threshold control 95; and a diode control tube 96 is provided, all as described in the Prescott patent. The construction of amplifier 215 is such that a control voltage applied across plates 97 and 98 of tube 96, varies the tuning of the amplifier in accordance with the magnitude of the control voltage. The upper and lower frequency limits are adjustable by means 94 and 95, in a manner described in the Prescott patent.

The arrangement of detectors 10 and 30, and control amplifier 134, is as described in connection with Figs. 1 and 2. In operation, upon decrease in signal strength as detector 30, the amplifier 215 is tuned for lower frequencies, and vice versa. The control operates at the right time, due to the predetermined spacing of detector 30.

Fig. 4 shows a modification in which provision of a separate or advance detector 30 is dispensed with, and the lag is compensated for electrically. Signal current is taken from leads 12 from detector 10, by branches 100 and 101, and the current is rectified and applied to amplifier 15, as in Figs. 1, 2 and 3. A delay circuit 102 is interposed between detector 10 and the main amplifier, as shown. The delay circuit is of a type known per se, consisting of inductors 103, 104 and 105 in series and condensers 106 and 107, in parallel as shown. The delay circuit compensates for the delay of the control amplifier circuit, and causes the volume or frequency control of amplifier 15 to be applied at the right times.

In Fig. 5 there is shown an embodiment of the invention arranged for automatic tuning of the signal amplifier in accordance with the momentary frequency of the waves received at an advance detector. This apparatus is useful in situations where the desired frequency predominates over all undesired frequencies. Referring to Fig. 5, a signal detector 10 is provided, connected at 14 and 15 to an amplifier 215 of the type shown in detail in Fig. 3, that is an amplifier arranged for tuning in accordance with an applied bias voltage. The amplifier output is delivered to a recorder 20 as in Fig. 3. An advance detector 30 is provided, arranged in the ground as described in connection with Figs. 1, 2 and 3 and delivering at terminals 32 and 33, to an amplifier 234, which is an amplifier of known type having automatic control adjusted for a high degree of control so that the output signal is of substantially constant amplitude whatever the amplitude of the input. A patent to Smith No. 1,904,552 describes an amplifier which is suitable for the present purposes; the automatic volume control of the patent amplifier being adjusted to "full control," so as to secure a high degree of leveling as described.

Amplifier 234 receives waves from detector 30 and applies a corresponding amplified signal of practically constant amplitude, to the grid 150 of a thyratron tube 151, which also has a cathode 152 and plate 153. The connection to the grid is made through a bias battery 154 and a lead 155, and the connection to the cathode is made through a lead 156, as shown. The plate is connected to the cathode through a condenser 157. An adjustable resistor 158 and a B-battery 159 are connected in circuit as shown, and the tube output is taken off through a resistor 160 and lead 161, and through a variable tap 162 for resistor 158 and a lead 163, as shown. A condenser 164 is connected across leads 161 and 163. Leads 161 and 163 are in connection with terminals 37 and 38 of amplifier 215 (cf. Fig. 3).

Tube 151 serves as a pulse integrator. In operation, detector 30 picks up seismic waves and delivers at 32 and 33 an oscillating signal of varying amplitude and of varying frequency. The amplified signal appearing at leads 155 and 156 is of varying frequency but of substantially constant amplitude. Bias battery 154 keeps the thyratron grid 150 sufficiently negative so that current will flow only on the peaks of the output wave of amplifier 234. On each peak, current flows, discharging condenser 157 through the plate circuit of the thyratron. Between peaks, this condenser becomes recharged from battery 159 through resistor 158, which is so adjusted that the condenser becomes practically completely recharged between peaks, even with the highest frequencies encountered. The average current through the resistor 158 depends on the number of times per second that condenser 157 is discharged; i. e. on the signal frequency. Thus the voltage across resistor 158 is proportional to the signal frequency delivered by amplifier 234. Part of the voltage is picked off at 162 and applied to terminals 37 and 38 for adjustment of the tuning frequency of the signal amplifier 215. The condenser 164 and resistor 160 serve as a filter to smooth out this control voltage.

In practice, the spacing between the main detectors 10 is usually in the range 10 to 200 yards, and the advance detector 30 is ordinarily spaced from 10 to 200 yards nearer the shot than the nearest main detector, and at a level in the earth from 0 to 200 yards below the level of the main detector.

What I claim is:

1. Seismograph prospecting apparatus comprising in combination means for detecting seismic waves in the earth and arranged to produce electrical signals corresponding to such waves, amplifying means having the input thereof connected to the detecting means, recording means for the amplified signals, electrically operable control means for the amplifying means and adapted to control a characteristic of the amplifying means in accordance with the magnitude of electrical energy applied to the control means, and means for delivering signal energy from the detecting means to said control means for operation of said control means at a time not later than the delivery of signal energy from the detecting means to the input of said amplifying means, said means for delivering signal energy to said control means comprising a detecting means nearer the source of seismic waves than the remaining detecting means, means for rectifying signals from said detecting means, and means for applying the rectified signal energy to the amplifier control means.

2. The apparatus of claim 12 wherein said electrically operable controller element is adapted to vary the gain of the amplifier.

3. The apparatus of claim 12 wherein said electrically operable controller element is adapted to vary the tuning of the amplifier.

4. Seismograph prospecting apparatus comprising in combination means for detecting seismic waves in the earth proceeding from a source thereof and arranged to produce electrical signals corresponding to such waves, amplifying means for the signals, recording means for the signals, electrically operable control means for controlling a characteristic of the amplifying means, an advance detector arranged in the earth to receive seismic waves before said detecting means receive the same waves and adapted to produce an electrical signal corresponding to such waves, and means for rectifying said signal and applying the rectified signal energy to the control means for operation thereof, said advance detector being spaced before said detecting means a distance such that the controlling action of the control means is exerted not later than the arrival of corresponding signal energy at the input of the amplifying means.

5. The apparatus of claim 4 wherein said advance detector is placed nearer the source of seismic waves than said detecting means, and likewise at a lower level than said detecting means, so that the advance detector is the first to receive both direct waves from the course, and waves coming upward from deep regions of the earth.

6. The apparatus of claim 4 wherein a plurality of detecting, amplifying and recording means are provided, and the advance detector and rectifying means are arranged to apply rectified signal energy simultaneously to all the control means of the several amplifying means.

7. An apparatus for seismograph prospecting including a plurality of detectors for detecting seismic vibrations and arranged to produce electrical signals corresponding to such vibrations, a plurality of amplifiers for the signals and recording means for the amplified signals, an advance detector positioned in the earth so as to receive seismic vibrations before said first-named detectors receive them, and control means for the amplifiers operated by the advance detector, and so constructed and arranged that upon arrival of strong vibrations at the advance detector, the amplifiers are rendered less sensitive, and upon cessation of strong vibrations at the advance detector the original sensitivity of the amplifiers is restored, the advance detector being positioned far enough ahead of said first-named detectors so that said control means are operated not later than the time of arrival of the corresponding signal at the input of the amplifiers.

8. Seismograph prospecting apparatus comprising in combination a plurality of detectors for detecting seismic vibrations and arranged to produce electrical signals corresponding to such vibrations, amplifying means for the signals and recording means for the amplified signals, an advance detector positioned in the earth so as to receive seismic vibrations before said first-named detectors receive them, tuning means for the amplifiers constructed and arranged to tune the amplifiers to different frequencies upon application of a varying control voltage to the tuning means, and means receiving signals from the advance detector and constructed and arranged to apply to said tuning means a voltage corresponding to the frequency of signals received at said advance detector.

9. Seismograph prospecting apparatus comprising in combination a plurality of detectors for detecting seismic vibrations and arranged to produce electrical signals corresponding to such vibrations, a plurality of amplifying means for the signals and recording means for the amplified signals, one of said detectors being located in the earth in advance of the other detectors so as to receive seismic waves before the other detectors receive them, and means connecting said detector to at least one of said amplifying means and constructed and arranged to vary the gain of said amplifying means in accordance with the signal received at said advance detector.

10. A seismograph prospecting apparatus comprising a plurality of electrical detectors spaced in the earth at different distances from a source of seismic waves, a plurality of amplifiers connected to the detectors, each amplifier including an electrically operable controller element adapted to vary a characteristic of the amplifier in accordance with the magnitude of electrical energy applied to the element, the elements being of a type such that said varying action thereof lags slightly behind corresponding changes in electrical energy applied thereto, means for taking electrical signal energy from a detector nearer to the source of seismic waves than other detectors, means for amplifying and rectifying said signal energy, circuit means for applying said amplified rectified signal energy to a plurality of the amplifier controller elements connected to detectors farther from the source, whereby signal energy is delivered to said controller elements slightly before signal energy is delivered to said amplifiers, and adjustable delay-introducing means associated with at least some of the amplifiers, constructed and arranged for bringing the times of said characteristic-varying action therein not later than the times of receipt of corresponding signals at said amplifiers.

11. A seismograph prospecting apparatus comprising a plurality of electrical detectors spaced in the earth at different distances from a source of seismic waves, a plurality of amplifiers connected to the detectors, each amplifier including an electrically operable controller element adapted to vary the gain of the amplifier in accordance with the magnitude of electrical energy applied to the element, the elements being of a type such that said gain-varying action thereof lags slightly behind corresponding changes in electrical energy applied thereto, means for taking electrical signal energy from a detector nearer to the source of seismic waves than other detectors, means for amplifying and rectifying said signal energy, circuit means for applying said amplified rectified signal energy to a plurality of the amplifier controller elements connected to detectors farther from the source, whereby signal energy is delivered to said controller elements slightly before signal energy is delivered to said amplifiers, and adjustable delay-introducing means associated with at least some of the amplifiers, constructed and arranged for bringing the times of said gain-varying action not later than the times of receipt of corresponding signals at the amplifiers.

12. A seismograph prospecting apparatus comprising a plurality of electrical detector means spaced in the earth at different distances from a source of seismic waves, a plurality of amplifiers connected to the detector means, each amplifier including an electrically operable controller element adapted to vary a characteristic of the amplifier in accordance with the magnitude of electrical energy applied to the element, a control circuit including means for taking electrical signal energy from detector means nearer to the source of seismic waves than other detector means, means for amplifying and rectifying said signal energy and means for applying said amplified rectified signal energy to the amplifier controller element of at least two of the amplifiers; said control circuit being so constituted that change in signal energy at the output thereof lags behind a corresponding change at the input thereof; and electrical delay-introducing means associated with at least two of the amplifiers, of different delay time characteristics and constructed and arranged to make the time at which the characteristic-varying action of the controller element of said amplifiers takes place, come not later than the time of receipt of a corresponding signal at said amplifiers.

13. A seismograph prospecting apparatus comprising a plurality of electrical detector means spaced in the earth at different distances from a source of seismic waves, a plurality of amplifiers connected to the detector means, each amplifier including an electrically operable gain controller element adapted to vary the gain of the amplifier in accordance with the magnitude of electrical energy applied to the element, a control circuit including means for taking electrical signal energy from detector means nearer to the source of seismic waves than other detectors, means for amplifying and rectifying said signal energy and means for applying said amplified rectified signal energy to the gain controller element of at least two of the amplifiers; said control circuit being so constituted that change in signal energy at the output thereof lags behind a corresponding change at the input thereof; and electrical delay-introducing means associated with at least two of the amplifiers, of different delay time characteristics and constructed and arranged to make the time at which the characteristic-varying action of the gain controller element of said amplifiers takes place, come not later than the time of receipt of a corresponding signal at said amplifiers.

OTTO F. RITZMANN.